(12) United States Patent
Chen

(10) Patent No.: US 11,671,812 B1
(45) Date of Patent: Jun. 6, 2023

(54) HOME NETWORK

(71) Applicant: Climax Technology Co., Ltd., Taipei (TW)

(72) Inventor: Yi-Kai Chen, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 23 days.

(21) Appl. No.: 17/544,226

(22) Filed: Dec. 7, 2021

(51) Int. Cl.
| | |
|---|---|
| *H04B 7/00* | (2006.01) |
| *H04W 4/80* | (2018.01) |
| *H04L 12/28* | (2006.01) |
| *H04W 4/02* | (2018.01) |
| *H04W 76/14* | (2018.01) |
| *H04W 8/00* | (2009.01) |

(52) U.S. Cl.
CPC ........... *H04W 4/80* (2018.02); *H04L 12/2803* (2013.01); *H04W 4/025* (2013.01); *H04W 8/005* (2013.01); *H04W 76/14* (2018.02); *H04L 2012/2841* (2013.01)

(58) Field of Classification Search
CPC ....... H04W 4/80; H04W 76/14; H04W 4/025; H04W 8/005; H04L 12/2803; H04L 2012/2841
USPC ...................................................... 455/41.2
See application file for complete search history.

(56) References Cited

U.S. PATENT DOCUMENTS

| | | | |
|---|---|---|---|
| 11,341,716 B1* | 5/2022 | Chen | G06V 20/20 |
| 2016/0174022 A1* | 6/2016 | Nhu | H04W 4/70 |
| | | | 455/41.2 |
| 2016/0269971 A1* | 9/2016 | Kim | H04W 72/1215 |
| 2017/0018167 A1* | 1/2017 | Dey | G08B 25/002 |
| 2017/0347385 A1* | 11/2017 | Dunsbergen | H04W 48/12 |
| 2019/0363901 A1* | 11/2019 | Hung | H04L 12/282 |
| 2020/0273024 A1* | 8/2020 | Gorilovsky | G06Q 20/389 |
| 2021/0110377 A1* | 4/2021 | Somasundaram | H04M 15/93 |

FOREIGN PATENT DOCUMENTS

| | | |
|---|---|---|
| EP | 3001715 A1 | 3/2016 |
| WO | WO2020/159755 A1 | 8/2020 |

OTHER PUBLICATIONS

Extended European Search Report dated May 13, 2022 in related European Application No. 21213250.0.
Office Action dated May 24, 2022 in corresponding Taiwan Patent Application No. 110145522.

* cited by examiner

*Primary Examiner* — April G Gonzales
(74) *Attorney, Agent, or Firm* — Donald E. Stout; Stout, Uxa & Buyan, LLP

(57) ABSTRACT

A home network includes a gateway and a wireless Bluetooth low energy (BLE) device. The wireless BLE device, adopting Bluetooth low energy protocol, is controlled by the gateway. When a user is at home, the gateway notifies the wireless BLE device to stop emitting an advertising signal; when the user is not at home, the gateway notifies the wireless BLE device to start emitting the advertising signal.

8 Claims, 5 Drawing Sheets

HOME NETWORK

BACKGROUND OF THE INVENTION

1. FIELD OF THE INVENTION

The present invention generally relates to a home network, and more particularly to a home network adopting Bluetooth low energy (BLE) protocol.

2. DESCRIPTION OF RELATED ART

A smart home network or home automation system may connect a variety of home electronic systems such as lighting, temperature control, entertainment, security and alarm systems, and may be used to improve quality of life, increase personal productivity, enhance home security and promote convenience of entertainment. The smart home network commonly adopts wireless technology such as Wi-Fi, Bluetooth or Zigbee, among which Wi-Fi has higher transmission rate and longer transmission distance, Bluetooth has higher security, and ZigBee has lower power consumption.

Bluetooth low energy (BLE) is a wireless personal area network protocol, which is distinct from classic Bluetooth protocol and uses communication technology substantially different from classic Bluetooth protocol. However, these two protocols may coexist in one device, for example, a dual-mode device. Compared to classic Bluetooth, BLE provides considerably low power consumption and cost, while maintains similar communication distance and uses the same radio frequency range. Due to low power consumption, a BLE device is ordinarily battery-powered, for example, powered by a button cell (or button battery).

According to BLE protocol, two BLE devices may exchange information to execute pairing by broadcasting advertising packets. One of the BLE devices transmits the advertising packets, and the other of the BLE devices listens to the advertising packets transmitted from the opposite BLE device. According to BLE protocol, transmission of the advertising packets repeatedly proceeds without stop. Therefore, in the long run, the transmission of the advertising packets occupies a substantive portion of overall power consumption.

A need has thus arisen to propose a novel scheme for further improving power consumption of the smart home network adopting BLE protocol.

SUMMARY OF THE INVENTION

In view of the foregoing, it is an object of the embodiment of the present invention to provide a home network capable of substantially reducing power consumption of a Bluetooth low energy (BLE) device, thereby effectively increasing battery lifetime.

According to one embodiment, a home network includes a gateway and a wireless Bluetooth low energy (BLE) device. The wireless BLE device is controlled by the gateway, and adopts Bluetooth low energy protocol. When a user is at home, the gateway notifies the wireless BLE device to stop emitting an advertising signal; when the user is not at home, the gateway notifies the wireless BLE device to start emitting the advertising signal.

DETAILED DESCRIPTION OF THE INVENTION

Figure 1:
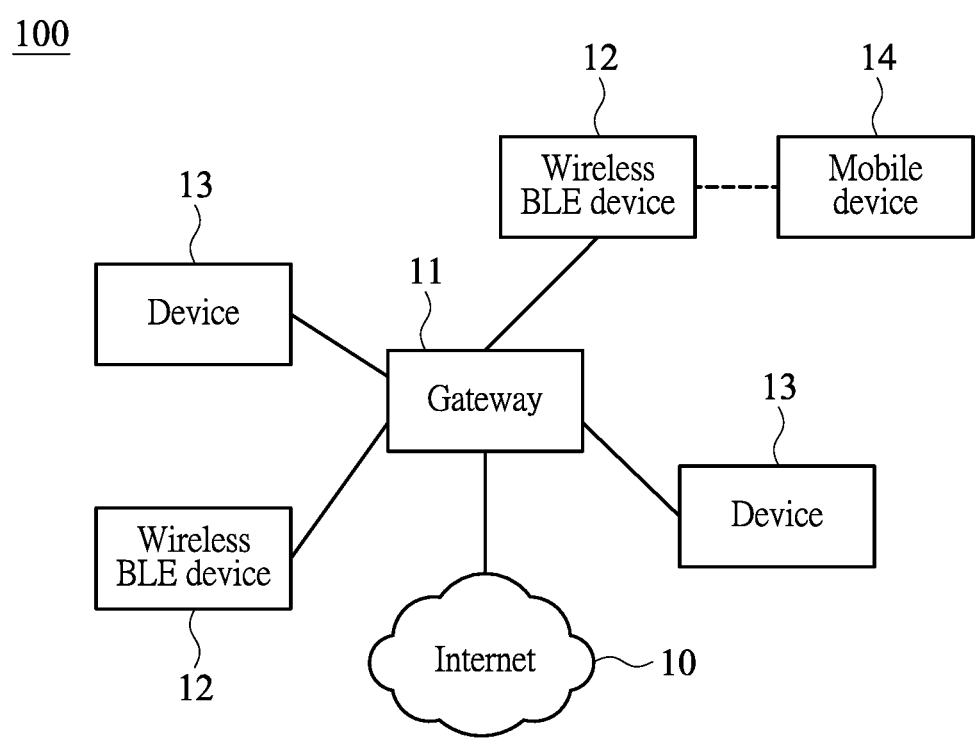
FIG. 1 shows a system block diagram illustrating a home network according to one embodiment of the present invention.

FIG. 1 shows a system block diagram illustrating a home network 100 according to one embodiment of the present invention. Home network is commonly called smart home network, which is one type of local area network.

The home network 100 may include a gateway 11 configured to connect to another network (usually a higher-level network such as wide area network or the Internet 10) adopting a different communication protocol.

According to one aspect of the embodiment, the home network 100 may include at least one wireless Bluetooth low energy (BLE) device 12, which is controlled by the gateway 11 in a wireless manner. The wireless BLE device 12 adopts Bluetooth low energy (BLE) protocol with advantage of low power consumption, and is ordinarily battery-powered, for example, by a button cell (or button battery). In one embodiment, the wireless BLE device 12 may be a wireless security interface device such as a wireless door lock or wireless keypad.

The home network 100 may also include some (non-BLE) devices 13, such as sensors, home appliances, security devices or alarms, which are controlled by the gateway 11 in wireless or wired manner.

In the embodiment, the home network 100 centrally controlled by the gateway 11 may be in one of the following three modes: home arm (or home) mode, away mode and disarm mode. Specifically, the away mode indicates that a user is not at home, and other modes indicate that the user is at home. When being in the home arm mode, some pre-selected sensors are armed or activated; when being in the away mode, all sensors are activated; and when being in the disarm mode, all sensors are disarmed. In another embodiment, the home network 100 may have modes that are different in type and quantity from the present embodiment. However, at least one mode indicates that the user is not at home, while other modes indicate that the user is at home.

According to BLE protocol, the wireless BLE device 12 emits an advertising signal (or packet) that facilitates pairing with a mobile device 14 (such as mobile phone) with BLE function. When pairing succeeds, the mobile device 14 may then control the wireless BLE device 12, for example, open a door lock.

Figure 2:
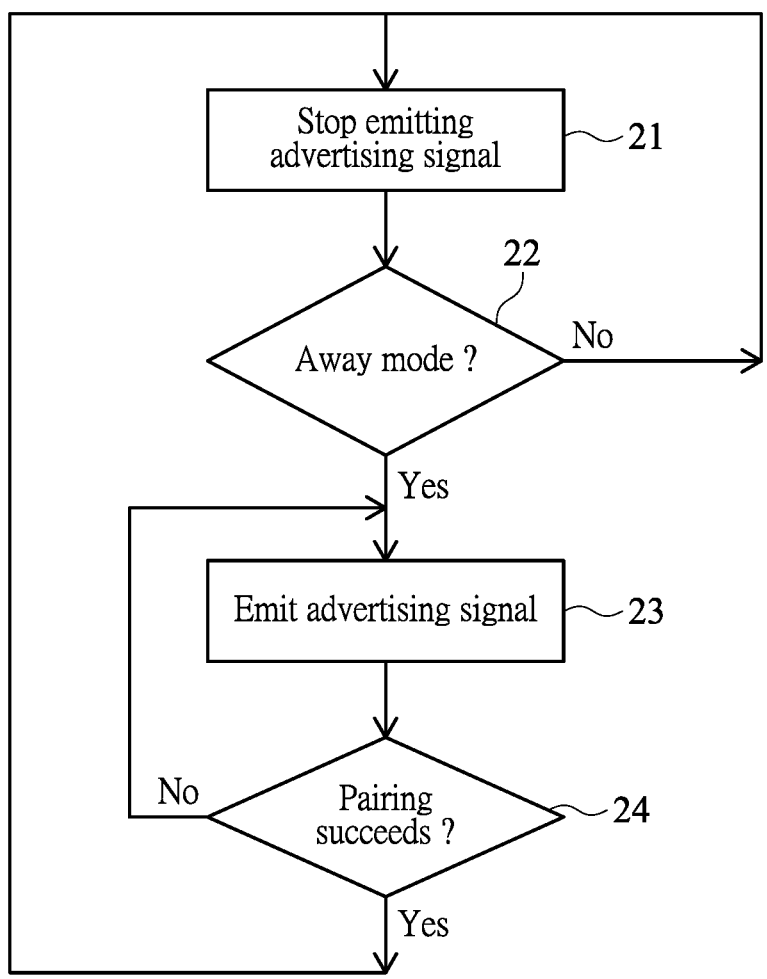
FIG. 2 shows a flow diagram illustrating a method of reducing power consumption in a home network according to a first embodiment of the present invention.

FIG. 2 shows a flow diagram illustrating a method 200 of reducing power consumption in a home network according to a first embodiment of the present invention, which may be adapted to the home network 100 of FIG. 1. Specifically, in step 21, the gateway 11 notifies the wireless BLE device 12 to stop emitting the advertising signal. Next, in step 22, the gateway 11 determines a current mode of the home network 100. If the current mode is not the away mode, indicating that the user is at home, the flow goes back to step 21 and continuously stops emitting the advertising signal. Therefore, the wireless BLE device 12 may substantially reduce power consumption, thereby effectively increasing battery lifetime.

In step 22, if the home network 100 is in the away mode, indicating that the user is not at home, the flow goes to step 23 and the gateway 11 notifies the wireless BLE device 12 to start emitting the advertising signal. If no mobile device 14 executes pairing with the wireless BLE device 12 (step 24), the flow goes back to step 23 and the wireless BLE device 12 continuously emits the advertising signal. If paring between the mobile device 14 and the wireless BLE device 12 succeeds (step 24), the gateway 11 relieves the away mode and the flow goes back to step 21, and the gateway 11 notifies the wireless BLE device 12 to stop emitting the advertising signal.

Figure 3:
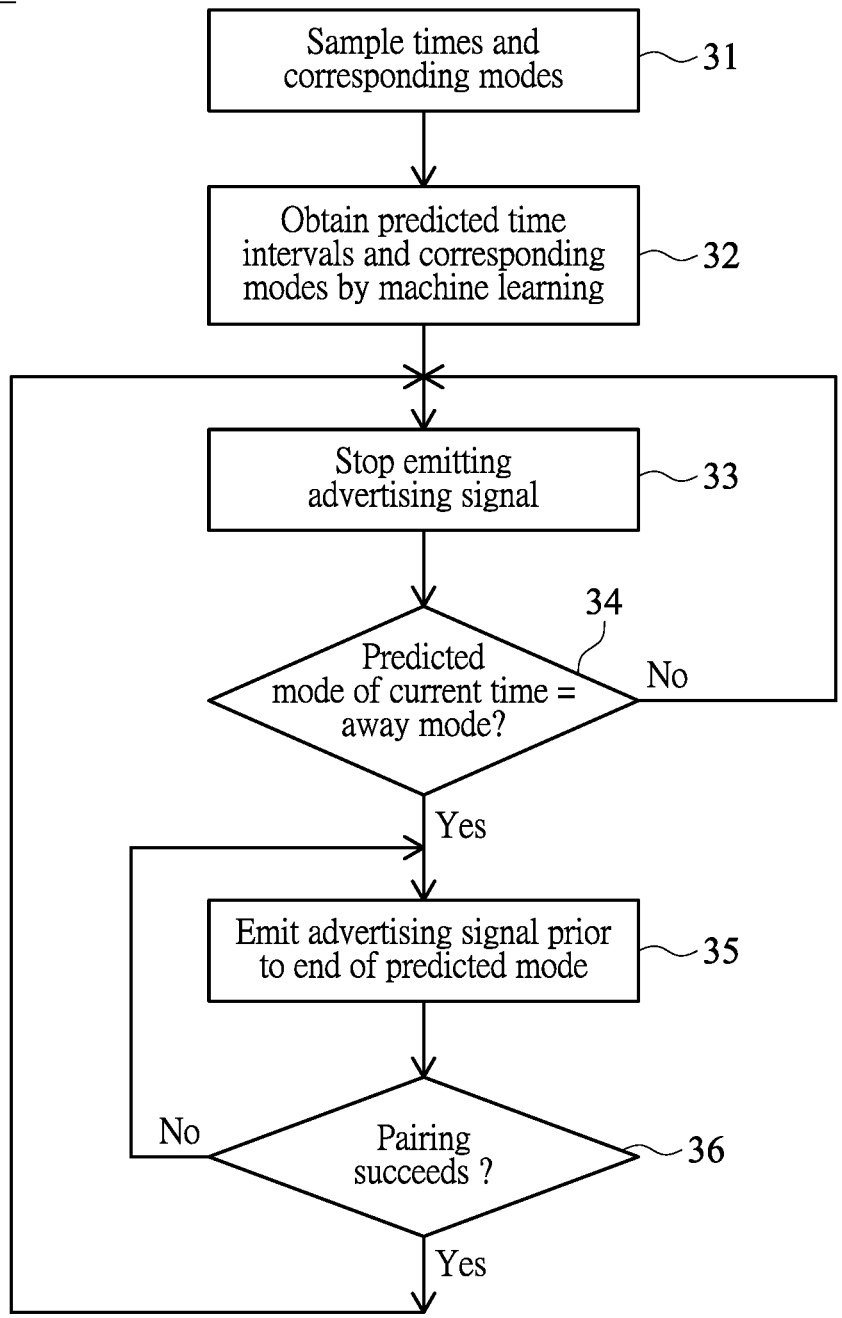
FIG. 3 shows a flow diagram illustrating a method of reducing power consumption in a home network according to a second embodiment of the present invention.

FIG. 3 shows a flow diagram illustrating a method 300 of reducing power consumption in a home network according to a second embodiment of the present invention, which may be adapted to the home network 100 of FIG. 1. Specifically, in step 31, the gateway 11 obtains sample data by sampling a plurality of times and corresponding modes from history records. Next, in step 32, the gateway 11 obtains prediction data composed of predicted time intervals and corresponding modes by applying machine learning technique (of artificial intelligence) performed on the sample data as training data.

In step 33, the gateway 11 notifies the wireless BLE device 12 to stop emitting the advertising signal. Next, in step 34, the gateway 11 determines a predicted mode of current time according to the prediction data. If the predicted mode is not the away mode, indicating that the user is at home, the flow goes back to step 33 and continuously stops emitting the advertising signal. Therefore, the wireless BLE device 12 may substantially reduce power consumption, thereby effectively increasing battery lifetime.

In step 34, if the predicted mode is the away mode, indicating that the user is not at home, the flow goes to step 35 and the gateway 11 notifies the wireless BLE device 12 to start emitting the advertising signal prior to an end of the predicted time interval of the away mode, for example, a few minutes before the end of the predicted time interval. If no mobile device 14 executes pairing with the wireless BLE device 12 (step 36), the flow goes back to step 35 and the wireless BLE device 12 continuously emits the advertising signal. If paring between the mobile device 14 and the wireless BLE device 12 succeeds (step 36), the gateway 11 relieves the away mode and the flow goes back to step 33, and the gateway 11 notifies the wireless BLE device 12 to stop emitting the advertising signal.

Figure 4:
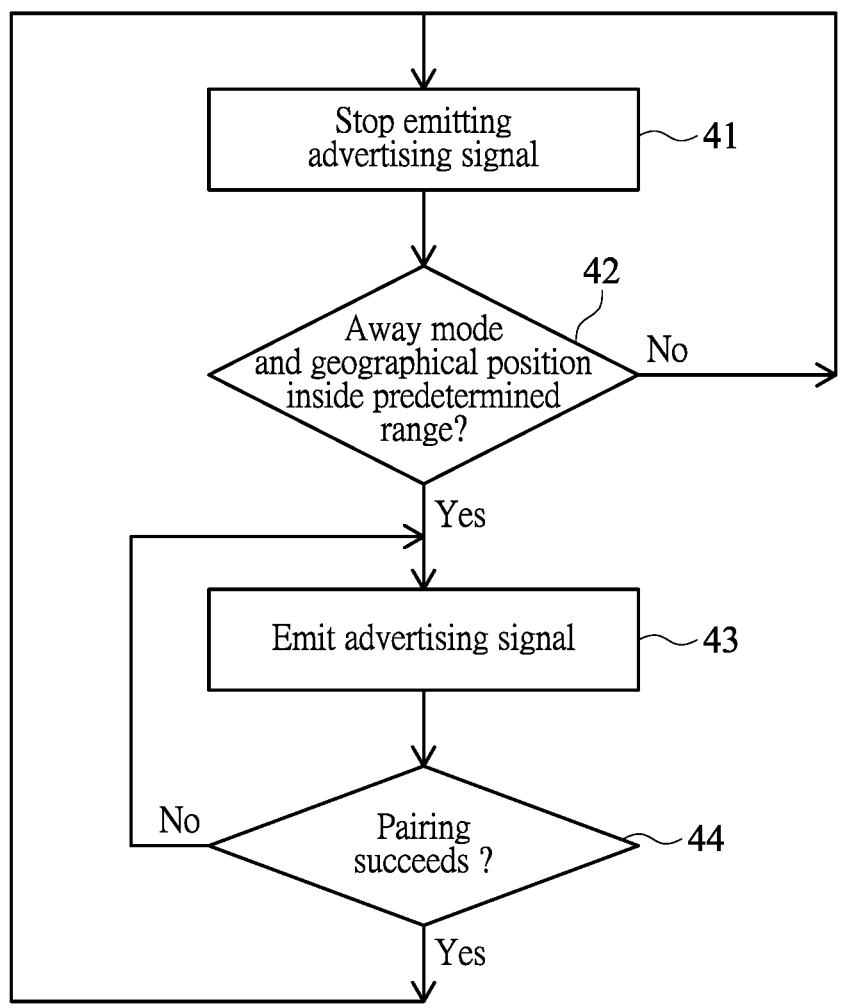
FIG. 4 shows a flow diagram illustrating a method of reducing power consumption in a home network according to a third embodiment of the present invention.

FIG. 4 shows a flow diagram illustrating a method 400 of reducing power consumption in a home network according to a third embodiment of the present invention, which may be adapted to the home network 100 of FIG. 1. Specifically, in step 41, the gateway 11 notifies the wireless BLE device 12 to stop emitting the advertising signal. Next, in step 42, the gateway 11 obtains geographical position of the mobile device 14 (such as mobile phone) of the user via location-based service (LBS). If the home network 100 is in the away mode and the geographical position is inside a predetermined range, indicating that the user is about entering the home, the flow goes to step 43 and the gateway 11 notifies the wireless BLE device 12 to start emitting the advertising signal. If no mobile device 14 executes pairing with the wireless BLE device 12 (step 44), the flow goes back to step 43 and the wireless BLE device 12 continuously emits the advertising signal. If paring between the mobile device 14 and the wireless BLE device 12 succeeds (step 44), the gateway 11 relieves the away mode and the flow goes back to step 41, and the gateway 11 notifies the wireless BLE device 12 to stop emitting the advertising signal.

In step 42, if the home network 100 is not in the away mode or the geographical position is not inside the predetermined range, the flow goes back to step 41 and continuously stops emitting the advertising signal. Therefore, the wireless BLE device 12 may substantially reduce power consumption, thereby effectively increasing battery lifetime.

Figure 5:
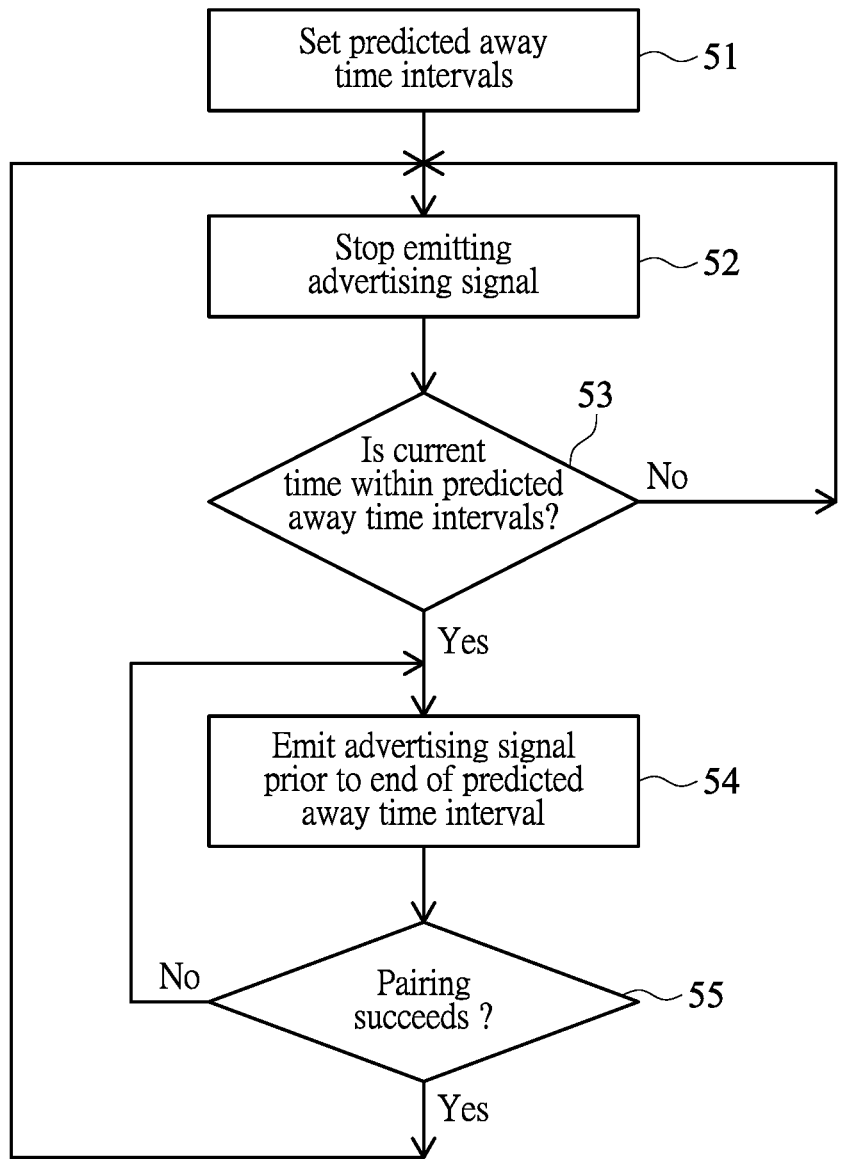
FIG. 5 shows a flow diagram illustrating a method of reducing power consumption in a home network according to a fourth embodiment of the present invention.

FIG. 5 shows a flow diagram illustrating a method 500 of reducing power consumption in a home network according to a fourth embodiment of the present invention, which may be adapted to the home network 100 of FIG. 1. Specifically, in step 51, the gateway 11 receives predicted away time intervals (during which the user may probably not be at home) and predicted home time intervals (during which the user may probably be at home) set by the user.

In step 52, the gateway 11 notifies the wireless BLE device 12 to stop emitting the advertising signal. Next, in step 53, the gateway 11 determines whether current time is within the predicted away time intervals. If current time is not within the predicted away time intervals, indicating that the user is at home, the flow goes back to step 51 and continuously stops emitting the advertising signal. Therefore, the wireless BLE device 12 may substantially reduce power consumption, thereby effectively increasing battery lifetime.

In step 53, if current time is within the predicted away time interval, indicating that the user is not at home, the flow goes to step 54 and the gateway 11 notifies the wireless BLE device 12 to start emitting the advertising signal prior to an end of the predicted away time interval, for example, a few minutes before the end of the predicted away time interval. If no mobile device 14 executes pairing with the wireless BLE device 12 (step 55), the flow goes back to step 54 and the wireless BLE device 12 continuously emits the advertising signal. If paring between the mobile device 14 and the wireless BLE device 12 succeeds (step 55), the gateway 11 relieves the away mode and the flow goes back to step 52, and the gateway 11 notifies the wireless BLE device 12 to stop emitting the advertising signal.

Although specific embodiments have been illustrated and described, it will be appreciated by those skilled in the art that various modifications may be made without departing from the scope of the present invention, which is intended to be limited solely by the appended claims.

What is claimed is:

1. A home network, comprising:
  a gateway; and
  a wireless Bluetooth low energy (BLE) device controlled by the gateway, the wireless BLE device adopting Bluetooth low energy protocol;
  wherein when a user is at home, the gateway notifies the wireless BLE device to stop emitting an advertising signal; when the user is not at home, the gateway notifies the wireless BLE device to start emitting the advertising signal;
  wherein the home network is in one of a plurality of modes, which include away mode and other mode, wherein the away mode indicates that the user is not at home, while said other mode indicates that the user is at home;
  wherein the gateway performs the following steps:
  obtaining sample data by sampling a plurality of times and corresponding modes from history records;

obtaining prediction data composed of predicted time intervals and corresponding modes by applying machine learning performed on the sample data as training data;

notifying the wireless BLE device to stop emitting the advertising signal; and when the predicted mode is the away mode, notifying the wireless BLE device to start emitting the advertising signal prior to an end of the predicted time interval of the away mode.

2. The home network of claim 1, wherein when the predicted mode is the away mode and paring between a mobile device of the user and the wireless BLE device succeeds, the gateway notifies the wireless BLE device to stop emitting the advertising signal.

3. The home network of claim 1, wherein the wireless BLE device comprises a wireless security interface device.

4. The home network of claim 3, wherein the wireless security interface device comprises a wireless door lock or wireless keypad.

5. The home network of claim 1, wherein the wireless BLE device is powered by a battery.

6. The home network of claim 5, wherein the battery comprises a button cell.

7. A home network, comprising:

a gateway; and a wireless Bluetooth low energy (BLE) device controlled by the gateway, the wireless BLE device adopting Bluetooth low energy protocol;

wherein when a user is at home, the gateway notifies the wireless BLE device to stop emitting an advertising signal; when the user is not at home, the gateway notifies the wireless BLE device to start emitting the advertising signal;

wherein the gateway performs the following steps:

receiving predicted away time intervals and predicted home time intervals set by the user; and when current time is within the predicted away time interval, the gateway notifies the wireless BLE device to start emitting the advertising signal prior to an end of the predicted away time interval.

8. The home network of claim 7, wherein when the current time is within the predicted away time interval and paring between a mobile device of the user and the wireless BLE device succeeds, the gateway notifies the wireless BLE device to stop emitting the advertising signal.

\* \* \* \* \*